United States Patent
Buzzell

[15] 3,655,494

[45] Apr. 11, 1972

[54] I. D. CARD LAMINAR STRUCTURES AND PROCESSES FOR MAKING SAME

[72] Inventor: Harold O. Buzzell, Wollaston, Mass.

[73] Assignee: Polaroid Corporation, Cambridge, Mass.

[22] Filed: May 12, 1969

[21] Appl. No.: 823,670

[52] U.S. Cl. .................................. 161/5, 40/2.2, 40/159, 96/29, 117/1, 117/76, 156/277, 161/6, 161/254, 161/413, 283/7

[51] Int. Cl. .................. B32b 27/04, G03c 5/54, G09b 3/02

[58] Field of Search ........................... 40/2.2, 157–158 R, 40/159; 283/7; 161/5, 6, 250, 252, 254, 406, 413; 96/29 D, 29 R; 156/277, 332, 334, 308; 117/1, 76 F, 138.8 UA, 138.8 A; 101/369

[56] References Cited

UNITED STATES PATENTS

| | | | |
|---|---|---|---|
| 3,545,380 | 12/1970 | Comegys et al. | 161/413 |
| 3,581,416 | 6/1971 | Andrews | 161/413 |
| 3,581,417 | 6/1971 | Andrews | 161/6 X |
| 3,582,439 | 6/1971 | Thomas | 161/5 |
| 3,313,052 | 4/1967 | Malster | 40/2.2 |
| 3,388,661 | 6/1968 | Decof | 40/2.2 X |
| 3,391,479 | 7/1968 | Buzzell et al. | 40/2.2 |
| 3,461,581 | 8/1969 | Hoffmann | 283/7 X |
| 3,487,567 | 1/1970 | Waybright | 40/2.2 |
| 3,498,788 | 3/1970 | Haas | 96/76 |
| 3,511,655 | 5/1970 | Haas et al. | 117/1 X |
| 3,512,286 | 5/1970 | Siegel | 40/2.2 |
| 3,520,758 | 7/1970 | Wiest | 161/5 |

*Primary Examiner*—Harold Ansher
*Attorney*—Brown and Mikulka and Alvin Isaacs

[57] ABSTRACT

Laminar structures such as identification (ID) cards and the like including an information-bearing surface, e.g., a photograph, having affixed thereto a substantially transparent overlay including a layer at least a portion of which is light-polarizing and which is preferably dyed or stained to provide a protective security feature for said structure, the laminar structure being characterized as having a strong dry bond, but possessing a poor wet bond whereby attempts to separate the information-bearing surface from the overlay with the aid of a solvent, e.g., water, will cause the polarizing layer to curl up and be effectively destroyed so that it cannot be reused.

10 Claims, 9 Drawing Figures

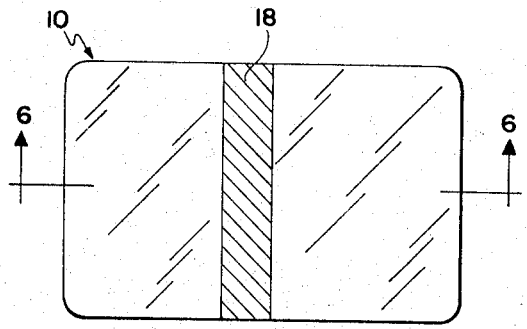
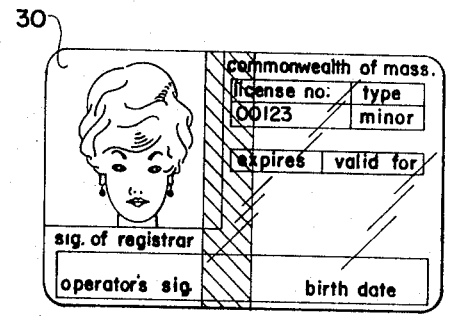
FIG. 1  FIG. 2
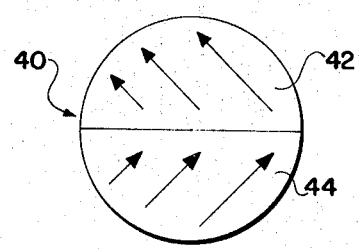
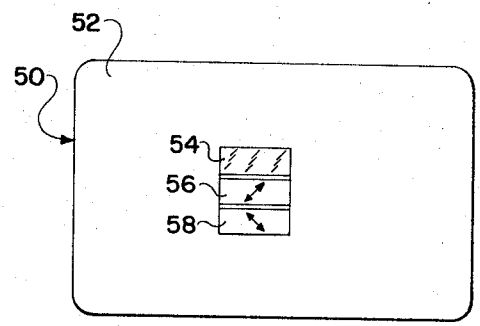
FIG. 3  FIG. 4
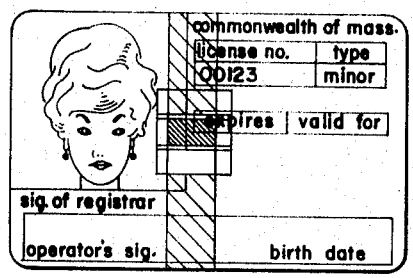
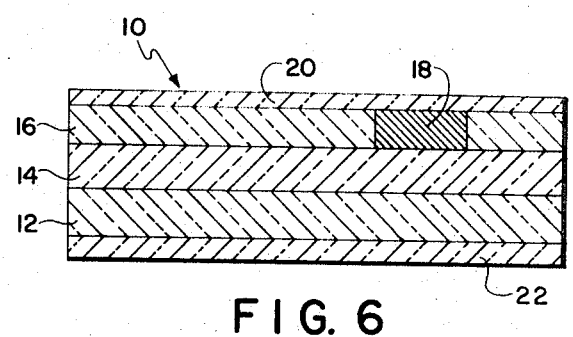
FIG. 5  FIG. 6
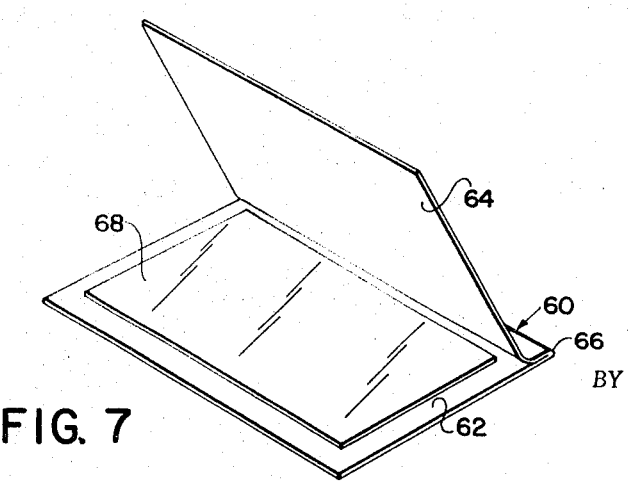
FIG. 7
INVENTOR.
HAROLD O. BUZZELL
BY
Brown and Mikulka
and
Alvin Isaacs
ATTORNEYS INVENTOR.
HAROLD O. BUZZELL
BY
Brown and Mikulka
and
Alvin Isaacs
ATTORNEYS

I. D. CARD LAMINAR STRUCTURES AND PROCESSES FOR MAKING SAME

BACKGROUND OF THE INVENTION

Identification (ID) cards have become increasingly prevalent in our society, not only for making credit purchases, but also as a means for identifying the intended bearer in such diverse places as business, manufacturing installations, governmental installations, colleges and universities, etc. where a more positive identification of the bearer is desired.

Such cards in general comprise an information-bearing surface containing suitable matter identifying the intended bearer and usually the issuer as well, the surface frequently being provided with a protective transparent overlay of some description.

One form of ID card becoming increasingly prevalent is the so-called photo ID card wherein the information-bearing surface includes a photo of the bearer, either in color or in black-and-white. This surface generally includes other descriptive indicia further identifying the bearer and/or issuer, validating signatures, identifying numbers and the like. This descriptive indicia may, in whole or in part, be a portion of the photograph along with the picture of the bearer or it may be contained on the information-bearing surface in other forms, e.g., typing, printing, etc. In some instances, the card may be "hole-punched" or embossed indicia may be supplied on the front or back of the card for machine processing of charges and the like.

Various security systems have heretofore been provided to prevent or to permit detection of tampering with such cards to prevent forgery and/or misuse by unauthorized persons. Some of these systems consist of some design or other matter on the protective overlay which is intended to be subject to detection if altered, for example, by severing the seal and substituting a new image-bearing surface.

One such system employs an overlay at least a portion of which is light-polarizing by being dyed with a suitable dichroic dye, or dyes, which system includes the use at an inspection station of a suitable "analyzer" to be described with more particularity hereinafter. The dye may be supplied in some pattern, for example, in the form of one or more stripes across one dimension of the overlay.

ID cards of this latter description are disclosed, for example, in U.S. Pat. No. 3,313,052 issued to Robert L. Malster and U.S. Pat. No. 3,391,479 issued to Harold O. Buzzell and Phoebe F. Jordan.

Laminations of the foregoing description are characterized as providing strong bonds, the polarizing overlay being such that any cutting and subsequent resealing will damage the overlay so that it can be detected by viewing through a suitable analyzing device. However, it has been found that it is possible to carefully remove the print from the overlay with the aid of a solvent such as water, leaving the polarizing overlay unaltered. This has been accomplished, for example, by applying water to the support for the print to remove the support, followed by continued application of water until the image-bearing surface is finally also removed, leaving the overlay. A substitute or forged print may then be reapplied to the overlay to provide a new laminar structure which may not be detectable as an alteration, thereby circumventing the security feature of the polarizing overlay.

The present invention is directed to this latter problem.

SUMMARY OF THE INVENTION

According to the present invention a laminar structure of the foregoing description including a transparent overlay, including a layer at least a portion of which is light-polarizing, is laminated to the image-bearing surface of a photo ID card or the like, the laminar structure being characterized as being a strong dry bond and a poor wet bond whereby attempts to remove the image-bearing surface in the aforementioned manner will cause the polarizing layer of the overlay to curl up and be effectively destroyed so that it cannot be rebonded to a substitute image-bearing surface, thereby precluding reuse of the security overlay.

BRIEF DESCRIPTION OF THE DRAWING

FIG. 1 represents a partially schematic plan view of a striped polarizing overlay for use in the practice of this invention;

FIG. 2 is a plan view of one type of ID card to which this invention is directed;

FIG. 3 represents one type of split-field light-polarizing device suitable for examining and analyzing laminations prepared by this invention;

FIG. 4 represents another type of split-field analyzer;

FIG. 5 is a plan view showing the ID card of FIG. 2 as viewed under a split-field analyzer such as shown in FIG. 4;

FIG. 6 is a diagrammatic sectional view of a laminar structure of this invention such as shown in FIG. 1;

FIG. 7 is a perspective view of a pouch suitable for containing the laminar structure in accordance with one aspect of this invention;

DESCRIPTION OF PREFERRED EMBODIMENT

Figure 8:
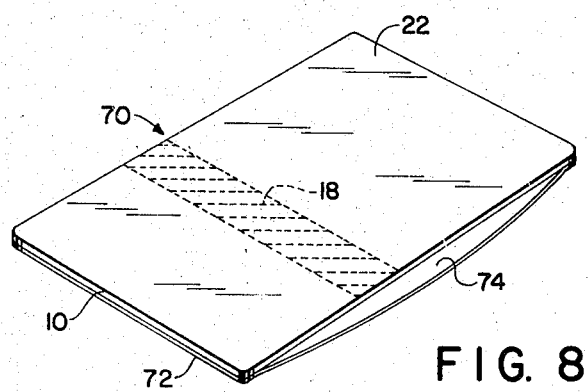
FIG. 8 is a similar view of another embodiment of this invention.

The present invention is particularly directed to photo ID cards, e.g., those prepared with a Polaroid ID-2 Land Identification System, provided with a protective transparent overlay including a layer of a light-polarizing material at least a portion of which contains a dichroic dye, which dye may be applied in the form of one or more stripes or in any other design or configuration.

As was mentioned previously, this invention relates to a novel security device for information-bearing surfaces such as ID cards and the like, and more particularly to novel overlays for detecting and/or preventing unauthorized tampering with, or alteration of, such information-bearing surfaces.

A primary object of this invention, therefore, is to provide novel overlays for information-bearing surfaces, which overlays when laminated to the information-bearing surface will provide a security means for authenticating the laminar structure.

Another object is to provide novel overlays including a substantially transparent sheet-like element, at least a portion of which is made light-polarizing by dyeing with at least one dichroic dye.

Yet another object is to provide laminar structures comprising an ID card or the like protected by an overlay of the foregoing description.

Still another object is to provide novel photo ID cards.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings.

The objects of this invention are accomplished by laminating to the information-bearing surface of an ID card an overlay including a layer of a transparent, molecularly oriented, linear polymer having a dichroic dye or stain adsorbed in at least a portion of the surface to render the adsorbed areas light-polarizing, the protective overlay being prepared in such a way that while the overlay is quite structurally stable under normal usage conditions, when one attempts to sever the overlay from the information-bearing surface with the aid of a solvent in order to forge or to counterfeit the ID card, upon contact with the solvent, the polarizing layer is effectively "destroyed" i.e., rendered incapable of being relaminated to a different information-bearing surface.

The protective overlays contemplated by this invention may be described with more particularity with reference to FIGS. 1 and 6 of the drawing.

As shown therein, the overlay 10 comprises essentially a transparent sheet material 12 having laminated thereto, in order, a layer of a transparent hydroxylated polymer 14, and a layer 16 of a transparent molecularly oriented plastic material having a dichroic dye or stain adsorbed in at least a portion of the surface to render it light-polarizing. In the embodiment shown, a dichroic dye is applied in the form of a single stripe 18. It will be appreciated, however, that other configurations are contemplated, as well as the use of two or more such stripes. One or more dichroic dyes, or mixtures thereof, may be employed.

Sheet 12 preferably comprises hydroxylated polymer such as polyvinyl alcohol or a polymeric material of which at least the surface of the interface with layer 14 is hydroxylated, e.g., at least partially hydrolyzed vinyl acetate vinyl chloride copolymers, at least partially hydrolyzed cellulose esters or at least partially hydrolyzed polyvinyl acetate. The surface hydrolysis of the latter class of materials may be accomplished, for example, by treatment with a sodium hydroxide solution, as was heretofore known and disclosed, for example, in the copending application of Harold O. Buzzell and Howard C. Haas, Ser. No. 451,894, filed Apr. 29, 1965, now U.S. Pat. No. 3,511,655. A preferred material is a cellulose ester, e.g., cellulose acetate, cellulose triacetate, cellulose butyrate, etc., which has been surface hydrolyzed. One particularly useful procedure for surface hydrolyzing is by treatment with sodium hydroxide in a water organic solvent solution, followed by washing to remove excess alkali and reaction products, Sheet 12 is preferably of a nature and thickness so as to provide satisfactory structural stability to the laminate.

Layer 14 comprises a hydroxylated polymer, e.g., polyvinyl alcohol and functions as an intermediate layer for bonding polarizing layer 16 to sheet 12.

Layer 16 may comprise one of the known transparent, molecularly oriented, linear, high molecular weight, hydroxyl-containing vinyl alcohol. Preferably, layer 16 has its molecules so oriented that the transmission or polarizing axis of the layer will be at 45° to the edge of the overlay. In known manner, the molecular orientation may be carried out by stretching the sheet in the presence of heat and by the application of opposed tensional forces. As will be well understood, the result of such stretching is to cause orientation of the molecules of the layer in a direction which is substantially parallel to the direction of application of the opposed stretching forces.

Stripe 18 may be applied by preparing a dye bath containing the desired dichroic dye or dyes, into which a felt wick of the desired thickness is suspended in such a way that its lower end is in the dye bath. Striping is then accomplished by passing layer 16 over and in contact with the upper end of the wick. Any excess dye may then be removed from layer 16 by washing, after which the thus dyed layer is then preferably dried by heating. To facilitate dyeing, it is frequently desirable to subject layer 16 to a pretreatment with a solution of at least one electrolyte containing at least one ion from the class consisting of anions and cations from the lyotropic series and of greater activity in this series than barium or chloride. Examples of such useful electrolytes include zinc chloride, lithium chloride, calcium thiocyanate and sodium hydroxide. This pretreatment is described with more particularity in U.S. Pat. No. 2,892,382.

As an example of a useful dichroic dye which may be employed to dye layer 16, e.g., to form stripe 18, mention may be made of "Solophenyl Navy Blue ABL" (trademark of Geigy Co. For a blue dye understood to be one of the copper-complexed disazo dyestuffs of the diphenyl series described in U.S. Pat. No. 3,399,187). Other useful dichroic dyes which may be employed include positive dichroic dyes such as:

| Name of Dye | Color Index No. | Other Designation |
|---|---|---|
| Direct Black 22 | 35435 | |
| Direct Black 38 | 30235 | |
| Direct Black 57 | 27720 | |
| Direct Blue 6 | 22610 | |
| Direct Blue 24 | | Prototype 569 |
| Direct Blue 80 | | Prototype 613 |
| Direct Blue 92 | | |
| Direct Brown 40 | | |
| Direct Green 6 | 30295 | |
| Direct Green 27 | | Prototype 470 |
| Acid Orange 74 | 18745 | |
| Direct Orange 32 | 20215 | |
| | 40215 | |
| Direct Orange 34 | 40220 | |
| Direct Orange 88 | | Prototype 626 |
| Direct Red 10 | 22145 | |
| Direct Red 16 | 27680 | |
| Direct Red 20 | 15075 | |
| Direct Red 32 | 28395 | |
| Direct Red 75 | 25380 | |
| Direct Red 81 | 28160 | |
| Direct Violet 4 | 22555 | |
| Direct Violet 86 | | |
| | 40001 | |
| Direct Yellow 6 | 40006 | |
| Direct Yellow 7 | 49010 | |
| Direct Yellow 11 | 40000 | |
| Direct Yellow 12 | 24895 | |
| Direct Yellow 20 | 22410 | |
| Direct Yellow 28 | 19555 | |
| Direct Yellow 44 | 29000 | |
| Direct Yellow 100 | | and; | negative dichroic dyes such as:

| Name of Dye | Color Index No. | Other Designation |
|---|---|---|
| Vat Blue-41 | 73040 | |
| Acid Brown-275 | | |
| Acid Green-43 | | |
| Acid Orange-60 | | |
| Vat Orange 3 | 59300 | |
| Vat Orange 9 | 59700 | |
| Acid Red 182 | | Prototype 591 |
| Mordant Red 3 | 58005 | |
| Acid Violet 70 | | |
| Acid Violet 75 | | |
| Vat Violet 2 | 73385 | |
| Vat Violet 17 | 63365 | |
| Acid Yellow 99 | 13900 | |
| Vat Violet | 70600 | |
| Vat Violet 21 | 69705 | |

While elements 12, 14 and 16 comprise the essential members of the protective overlay, a layer containing an ultraviolet (UV) absorber 22 and an outer layer 20 of a hydroxylated polymer, preferably polyvinyl alcohol, are also provided. Where the information-bearing surface tends to be adversely affected to some extent by prolonged exposure to UV light, e.g., fading, the reason for providing a UV absorber will be quite apparent. Suitable UV absorbers and layers containing the same are per se old and comprise per se no part of this invention. As examples of suitable UV absorbers, mention may be made of those disclosed in U.S. Pat. Nos. 3,330,656; 3,183,219; and 3,330,680. Layer 20 may be desirable to insure complete uniformity of the seal between the overlay and the information-bearing surface of the card. Substantially the same effect is obtained if the surface of the card or the overlay itself is wetted with an aqueous hydroxylated polymer solution as a dope immediately prior to lamination. However, neither procedure is mandatory, satisfactory laminations being prepared by omission of the layer 20.

It is to be noted, however, that layer 20 provides a strong bond with the surface of the card in a substantially shorter period of time and for this reason is frequently preferred.

The protective overlay described above may be prepared by coating the various layers 14, 16 and 20 onto the surface of sheet 12 from aqueous solutions containing the same in accordance with conventional coating techniques. The following illustrates a typical procedure for preparing an overlay containing the various layers shown in FIG. 6. A cellulose triacetate sheet material is treated with a sodium hydroxide solution to hydrolyze one surface thereof. An aqueous solution of the desired hydroxylated polymer is then coated onto the hydrolyzed surface and dried to form layer 14. A film of a hydroxyl-containing vinyl polymer which has been molecularly oriented in the manner previously described is then laminated to the free surface of layer 14 by moistening and/or with the aid of an appropriate dope, accompanied by pressing. Layer or film 16 is then treated with a suitable electrolytic solution, e.g., sodium hydroxide, to facilitate dyeing, after which a dichroic dye (or dyes) is applied in the manner previously described. An aqueous solution of a hydroxylated polymer is then coated on the thus dyed layer to form layer 20. UV absorber-containing layer 22 is preferably applied to one surface of element 22 prior to hydrolysis of the other surface and subsequent coating steps, although it may obviously be applied following completion of any of the aforementioned coating steps.

While the use of the protective overlays of this invention is not restricted to any specific type of information-bearing surface, it is well adaptable to those so-called photo ID cards containing a photographic likeness of the bearer and descriptive information pertaining to the bearer and issuer, as illustrated in FIG. 2. Of particular interest are color photographs containing the same.

Since speed and ease of production are important in the mass production of such photo ID cards, it is, of course desirable that the subject or bearer be photographed and the card prepared and issued on the spot. The preferred system for preparing the color photo accordingly utilizes the color diffusion transfer techniques described and claimed in U.S. Pat. No. 2,983,606 issued to Howard G. Rogers wherein a photosensitive element comprising a blue-sensitive, a green-sensitive and a red-sensitive silver halide emulsion having associated therewith a yellow dye developer (dye which is also a silver halide developing agent), a magenta dye developer and a cyan dye developer, respectively, is exposed to form a developable image and the thus exposed element is then developed with an aqueous alkaline processing composition to form an imagewise distribution of mobile and diffusible dye which is then transferred at least in part, by imbibition to a superposed dyeable stratum to impart thereto the desired positive multicolor reproduction of the original. Where true color fidelity is not essential in the reproduction, variations in the foregoing procedure will be readily apparent to those skilled in the photographic art. For example, a single silver halide emulsion and associated dye developer may be employed in accordance with the procedures described in the aforementioned U.S. Pat. No. 2,983,606 to form a monochromatic transfer image.

In any event, the dyeable stratum to which the color transfer image is imparted preferably comprises a film-forming material such as polyvinyl alcohol or a mixture of polyvinyl alcohol and polyvinyl pyridine such as poly-4-vinyl pyridine. It may also include other materials serving specific functions in these photographic processes, e.g., dye mordants, antifoggants, pH adjusters, etc. Dyeable strata and elements including strata of this description are described in U.S. Pat. No. 3,148,061 as well as the aforementioned U.S. Pat. No. 2,983,606.

The color diffusion transfer system described above may be employed in conjunction with a Polaroid ID-2 Land Identification System wherein the subject and a data card containing the desired descriptive information are simultaneously photographed to provide a single photograph containing both, which photograph may be in the general format indicated in the laminar structure of FIG. 2, the protective overlay 10 being shown to be laminated to the image-bearing surface of a photo ID card 30.

The lamination may be accomplished simply by pressing the surface of layer 20 of overlay 10 against the color transfer print in the presence of moisture. To provide the desired moisture, the color print may be pressed against the overlay while still slightly damp from processing, thereby contributing to the overall rapidity of the process, or, in lieu thereof, a dry print may be moistened at some time after processing and then pressed against the overlay to provide the laminar structure.

Apart from protecting the information-bearing surface from abrasion and wear and tear in normal usage, the overlay provides significant protection against tampering and counterfeiting. The strong seal or bond between the image-bearing surface and the overlay prevents severing of the two with the aid of a razor blade or the like in order to substitute a counterfeit or forged card. In addition, the dyed light-polarizing area, e.g., stripe or stripes 18, possesses a definite hue and intensity which, in and of itself, renders the card distinctive, but, more important, when such a card is viewed in polarized light, such as through a suitable light-polarizing analyzing device, the light-polarizing properties of the dyed areas are quite distinguishable from what appears to be a similar dye in color but which is not light-polarizing.

In order fully to understand this feature of the invention a brief understanding of "dichroism" and "dichroic dyes" is necessary. The term "dichroism" denotes the property of differential absorption of the components of an incident beam of light depending upon the vibration directions of the components. By "dichroic dye or stain" is meant a dye or stain whose molecules possess the property of showing dichroism. This dichroic property is displayed when the dichroic dye (or dyes) is incorporated in molecularly oriented plastic materials in that the resulting dyed areas show dichroism. As is well known, a dichroic dye or stain has relatively a light absorption axis and a light transmission axis, the two axes being arranged essentially at right angles to each other. Unpolarized light incident on such a substance will have a transmitted component and an absorbed component. The transmitted component will be polarized in the plane of the transmission axis which, as indicated, is located at 90° to the absorption axis. The absorption axis of certain dichroic materials is located at an angle of 90° with respect to the absorption axis of certain other dichroic materials when placed in a common matrix. This difference in the positioning of the absorption axis causes a dichroic substance to be designated as "positively dichroic" or "negatively dichroic" in accordance with the location of its absorption axis. In other words, positive and negative dichroic substances have their absorption axes mutually perpendicular in a common matrix. Thus, for example, if a suitable oriented transparent plastic material is dyed or stained with a positive dichroic stain or dye and the area so dyed or stained is viewed in polarized light, the vibration direction of which is parallel to the orientation direction of the molecules of the plastic material, the dichroic dye will be observed to be somewhat darker or more dense in hue; while if the same area is viewed in polarized light the vibration direction of which is perpendicular to the orientation direction of the plastic material, the color of the positive dichroic dye will appear to be substantially eliminated. Conversely, if the plastic material is dyed or stained with a negative dichroic dye or stain, and the area dyed or stained is viewed in polarized light the vibration direction of which is parallel to the orientation direction of the molecules of the plastic material, the color of the negative dichroic dye appears to be substantially eliminated while, if the same area is viewed in polarized light, the vibration direction of which is perpendicular to the orientation direction of the plastic material the dyed or stained area will appear to be somewhat darker or denser in hue. The aforementioned properties make it possible for an ID card containing such an overlay to be examined at an inspection station with a suitable light-polarizing analyzing device such as those heretofore known in the art. Virtually any polarized light source can be used to provide such an analyzer. Perhaps the simplest, however, is a substantially transparent light polarizer such as a polarizing sunglass, for example. If the card is viewed through such a device the dyed or striped area will appear to be darker or lighter depending upon whether the vibration direction is parallel or perpendicular to the orientation direction of the polarizing portion of the overlay, as discussed above. When the analyzer is rotated through 90° the reverse effect is, of course, obtained.

In order to avoid the necessity of continuously rotating the analyzing device in examining cards for authenticity, it is particularly convenient to employ a "split-field" polarizer, that is, a planar light-polarizing element comprising two sections joined together in the same plane, the vibration direction of one section being perpendicular to that of the other. FIG. 3 shows such an analyzer 40, the upper half 42 having a vibration direction indicated by the position of the arrows to be perpendicular to the vibration direction of the lower half 44. When such an analyzer is placed over a card such as shown in FIG. 2, one-half of the dyed area under the analyzer will appear darker and the other half lighter as indicated above. It will be appreciated that whether the top half or the bottom half appears lighter or darker will depend upon whether a positive or a negative dichroic dye is employed.

FIG. 4 shows another type of analyzer 50 shown to comprise a frame 52 of substantially the same dimensions as the card, the frame being provided with three "windows" so positioned within the frame that when the analyzer is placed over the card the three windows are positioned over a portion of the dyed polarizing area as shown in FIG. 5. Window 54 is indicated to be an ordinary transparent member, e.g., transparent plastic or glass while windows 56 and 58 are polarizers, the vibration directions of which are perpendicular to one another as shown by the arrows. Thus, windows 56 and 58 are similar to polarizers 42 and 44 of analyzer 40 (FIG. 3). When the analyzer shown in FIG. 4 is placed over the card (FIG. 5), the dyed area beneath window 54 appears substantially unchanged, i.e., it appears to be essentially the same as it did before the analyzer was placed over it, whereas, the areas under windows 56 and 58 appear darker or lighter, as was discussed above.

While reference has been made to the use of a single positive or negative dichroic dye it is contemplated that one may dye certain areas of the overlay with a positive dichroic dye and other areas with a negative dichroic dye. Likewise, given areas may be dyed with a mixture of dyes, for example, a positive dichroic dye and a negative dichroic dye, to provide a dyed area of a particular color to the eye. However, when an analyzer is employed as discussed above, either the positive or the negative dichroic dye color will predominate depending upon the vibration direction of the analyzer with respect to that of the dyed area. The use of a mixture of a positive and a negative dichroic dye is described and claimed in U.S. Pat. No. 3,391,479 issued to Harold O. Buzzell and Phoebe F. Jordan, and accordingly, per se comprises no part of this invention.

The laminar structure thus formed by applying the polarizing overlay to the information-bearing surface, e.g., as shown in FIG. 2, may be employed as such. However, it is within the scope of this invention to seal this laminar structure within a pouch or carrying case, as desired. In its simplest form, a typical pouch consists essentially of a transparent front sheet sealed along three edges to a back sheet which is usually opaque. Either or both of these sheets may be made of an embossable material so that descriptive matter usually employed in connection with the use of printing machines for recording transactions may be applied. Pouches of this nature are heretofore known in the art. The laminar structure may be inserted into the pouch through the open end which may thereafter be sealed to encase the card. If desired, the respective surfaces of the card may be sealed to the provide a still further security feature.

Another type of pouch or case suitable for use is shown in FIG. 7. As shown therein, case 60 comprises a single sheet of flexible opaque material folded at substantially the center 66 to provide two substantially equal parts, a top member 64 and a bottom member 62. A transparent member 68 is sealed along three sides to the inner surface of member 62, preferably by heat sealing, to define a pouch adaptable for containing the card. Again, transparent member 68 may be made of an embossable material if desired, as could material 64. Following insertion of the card face up into the pouch defined by members 62 and 68, the open end is then preferably sealed to encase the card. The front and/or back members may be provided with suitable indicia in the form of printing, dyeing, or stamping lettering and/or a distinctive design identifying the issuer, if desired.

Other carrying devices are also contemplated, e.g., No. 985 Dual Bond Seal, a plastic envelope comprising a transparent front material and an opaque rear member sealed together along one edge, the rear member having an adhesive coating on its inner surface protected by a removable paper coating, sold by Polaroid Corporation, Cambridge, Massachusetts.

In still another aspect of the invention, the novel overlay of this invention may be sealed along one or more edges to a suitable base material, preferably an opaque or translucent material which may be flexible, rigid, or semirigid, as desired, the overlay and the base material being of substantially equal dimensions. Following lamination of the card to the inner surface of the overlay and base sheet are brought into superposition and the remaining (unsealed) edges of the respective elements are then sealed to encase the card.

One such structure is shown in FIG. 8 wherein case or pouch 70 is shown to comprise overlay 10 and sheet material 72 sealed together along three sides with the polarizing layer innermost, i.e., with transparent member 22 (FIG. 6) on the outside, leaving a fourth side 74 open for insertion of the card. Following insertion of the card through the opening with the information-bearing surface facing overlay 10, pressure is applied to effect the lamination and the open end 74 is preferably also sealed. Preferably, the laminating and sealing are accomplished concurrently, e.g., by passing through a pair of opposed heated pressure rollers to effect lamination by the exerted pressure and at the same time heat-sealing the free end.

Figure 9:
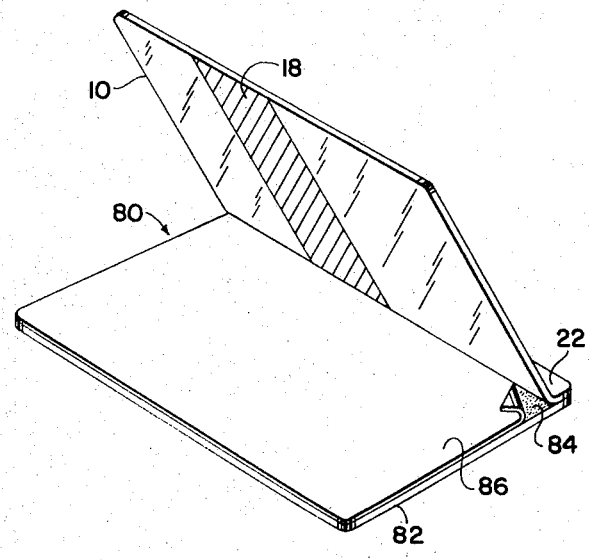
FIG. 9 is a similar view of still another embodiment of the invention.

Yet another embodiment is shown in FIG. 9 wherein envelope 80 is illustrated to include overlay 10 sealed to base member 82 along one side with the laminating surface of overlay 10 facing inward. Base member 82, which may be transparent or opaque, is coated with a pressure-sensitive adhesive 84, over which is placed a removable release sheet 86 of coated paper or the like. Envelope 80 may be formed by coating the entire surface of base sheet 82 with the pressure-sensitive adhesive and then applying a release sheet of somewhat shorter width, leaving one longitudinal edge uncovered. By then placing the base sheet and the overlay in superposition and pressing, the two will be secured together along the uncovered edge, as shown.

As will be more apparent hereinafter, envelope 80 is somewhat greater in dimensions than the card to be encased therein. To encase the card, it is first centered with the information-bearing surface against the inner surface of overlay 10. Release sheet 86 is removed and the overlay is pivoted into superposition with the base sheet. Pressure is applied to seal the superposed edges of base sheet 82 and overlay 10 extending beyond the periphery of the card through the adhesive layer and to laminate the card securely to the overlay, thereby providing a product wherein the card is completely sealed between the two superposed sheets with the rear surface of the card secured to the base member through the adhesive coating, the front or information-bearing surface laminated to the overlay, and the overlay and base member in turn sealed together along their respective periphery. Structures such as shown in FIG. 9 are also described and claimed in the copending application of Paul A. Andrews, Ser. No. 718,985 filed Apr. 1, 1968.

The following examples show by way of illustration and not by way of limitation the practice of this invention.

EXAMPLE 1

One surface of a sheet of transparent cellulose triacetate about 5 mils thick was treated with 20% NaOH in a 50:50 water-methanol mixture at 45° C. for about 8 seconds. The sheet was then washed first by spraying water and then in a water bath to remove the sodium hydroxide. On the thus treated surface was then coated 1.5 percent "52–22 Elvanol" (trademark of E. I. duPont deNemours & Co. for a partially hydrolyzed polyvinyl alcohol, 86–89 percent hydrolyzed, medium viscosity, 19–25 centipoises) in a 50:50 water-methanol solution the coating being applied at about 17 feet per minute. The coated sheet was then dried in an oven at about 90°–95° C. A film of polyvinyl alcohol molecularly oriented at a 45° angle having a thickness of about 0.7 mil was then laminated by moistening. The molecularly oriented PVA layer was then washed with methanol for about 16 seconds and sprayed with water. The sheet was then baked in an oven at 60° C. for about a minute. The molecularly oriented PVA layer was next treated with 20% NaOH in 50:50 water-methanol at 45° C. for about 16 seconds, washed with two water sprays followed by a water bath, and then baked for 1 minute at 60° C. The thus treated layer was then "striped" by applying an aqueous solution of 4 percent "Solophenyl Navy Blue ABL" and 10 percent by volume of 50 percent sodium hydroxide, the dye solution being applied with a felt striper at 62° C. for about 15 seconds. The thus "striped" polarizer sheet was then subjected to two successive water sprays to remove excess dye, after which it was baked at 90° C. 2 percent "52–22 Elevanol" in a 50:50 water-methanol solution was then coated on at about 17 feet per minute to yield a product such as is shown in FIG. 1.

EXAMPLE 2

Polacolor Type 108 Land film was inserted into the No. 926 Land Identification System. A data card was then inserted and this card and the subject were simultaneously photographed to provide a developable image on the photosensitive element of the film. The exposed photosensitive element was then pulled from the camera while in superposition with the image-receiving element of the film, the two elements being maintained in superposition outside the camera for about 60 seconds and then separated to reveal a positive multicolor transfer image. The image-bearing surface of this color print was then pressed while still moist from processing against the coated side of the polarizing overlay prepared in Example 1. The respective elements were securely bonded together to provide an ID card such as is shown in FIG. 2.

EXAMPLE 3

Over the polarizing stripe of the ID card prepared in Example 2 was positioned a "split-field" analyzer such as shown in FIG. 4 employing two molecularly oriented polyvinyl alcohol light-polarizing elements and a sheet of transparent non-polarizing plastic the respective elements being positioned in the same plane with the vibration direction of one of the polarizers being perpendicular to that of the other polarizer. When viewed from above by reflected light, the portion of the stripe beneath the non-polarizing transparent plastic sheet was "unchanged"; the portion under one of the two polarizers appeared substantially darker, while the portion under the other polarizer was barely noticeable.

EXAMPLE 4

A card prepared as in Example 2 was inserted face up into the pouch of a carrying case as shown in FIG. 7, after which the open end was heat sealed to encase the card completely.

As was mentioned previously, ID cards containing a polarizing overlay have been heretofore known in the art. ID cards including a polarizing overlay stained or dyed with a dichroic stain or dye are disclosed, for example, in U.S. Pat. No. 3,313,052 issued to Robert L. Malster and U.S. Pat. No. 3,391,470 issued to Harold O. Buzzell and Phoebe F. Jordan.

However, the present invention provides a sophisticated improvement over those prior ID cards possessing an overlay including a molecularly oriented plastic material dyed or stained with a dichroic dye or stain. While the prior products may seem to the eye to be quite identical, they are structurally quite different. One skilled in the art following the teachings of these patents and the state of the polarizer art would treat the dyed polarizer layer and/or the underlying layer with a cross-linking agent in accordance with the teachings of U.S. Pat. Nos. 2,996,956 and 3,058,303 cited in Col. 7 of the aforementioned U.S. Pat. No. 3,391,479.

This cross-linking step and resulting reduction of water solubility would be employed to provide greater wet bond strength and/or to prevent washing out and/or lateral diffusion of the water-soluble dye during the subsequent coating of the hydroxylated polymer overlayer. The essence of the invention is the elimination of this step from the prior procedures to obtain an overlay possessing unobvious superior properties. While in some instances, the application of the dichroic dye may in some instances result in some slight cross-linking of the linear polymer so dyed, the resulting layer is characterized as being non-cross-linked, as distinguished from those layers subjected to a cross-linking step, as described above.

While the prior art polarizing overlay cannot be readily separated from the card by mechanical means such as cutting or slitting without the separation being noticeable, it has been found that the two elements can be separated by solvent action, e.g., by the use of water alone. In this procedure, the backing for the card, e.g., the paper base of a color photograph, is first removed and with continued or subsequent solvent treatment, the various other layers including the information-bearing surface are consecutively removed, leaving the overlay in undamaged condition. The overlay may then be relaminated to a substitute or forged card to provide a false ID card, thereby frustrating the very reason for which the overlay was employed in the first place.

The present invention completely obviates this deficiency in the security feature of the prior polarizing overlays by providing a similar appearing overlay which possesses the same dry strength in terms of a dry security seal, but which when attacked by a solvent in the aforementioned manner will cause the polarizing layer to separate from the transparent sheet material, e.g., element 12 of the drawing and curl up and be effectively destroyed so that it cannot be used again. Since the polarizing layer has not been hardened, the solvent will permeate through it to the underlying layer, destroying the bond and in turn destroying the polarizing layer in the aforementioned manner so that it cannot be reused. Typically, the polarizing layer will remain laminated to the image-containing layer and this laminar structure will curl up together. In any event, this layer cannot be recovered and applied again to a transparent sheet so as to again provide a polarizing overlay. In other words, once solvent attacks the bond to cause this layer to curl, it is incapable of further use in the contemplated manner.

It is interesting to note that, contrary to what would be expected, the dyed layer was not adversely affected by the subsequent coating step. In other words, it was found quite unexpectedly that the dye did not wash out or diffuse laterally, even though the layer was not subjected to a cross-linking agent.

The following example illustrates the novel feature of this invention.

EXAMPLE 5

The ID card prepared in Example 2 was found to possess a very strong dry bond which withstood attempts at a separation with such standard test devices as a razor blade. Yet, when water was applied to the support for the color print and permitted to permeate through to the polarizing overlay containing the dye stripe, the bond was quickly broken and the polarizing overlay separated from its support and curled up along with the image-containing layer thereby preventing reapplication of this polarizing layer to another or substitute print.

From the foregoing specification and illustrative examples, it will be seen that the present invention provides an improved protective, security overlay for preventing tampering with and/or counterfeiting ID cards and the like.

What is claimed is:

1. A laminar structure comprising, in order, a photo ID card to the image-containing surface of which is laminated a first transparent layer of a hydroxylated polymer comprising polyvinyl alcohol; a layer containing a transparent, molecularly oriented, non-cross-linked, high molecular weight, hydroxyl-containing vinyl polymer, a portion of which has been dyed with a dichroic dye to render it light-polarizing, laminated to said hydroxylated polymer layer; a second layer of hydroxylated polymer comprising polyvinyl alcohol laminated to sad vinyl polymer layer; and a transparent sheet material laminated to said second layer of hydroxylated polymer, said sheet material comprising a cellulose ester, the laminated surface of which has been hydrolyzed.

2. A laminar structure as defined in claim 1 including an ultraviolet light absorber in a layer on the side of said transparent sheet material opposed from said second layer of hydroxylated polymer.

3. A laminar structure as defined in claim 1 wherein said photo ID card comprises a dyeable stratum containing a color diffusion transfer image.

4. An ID product comprising a laminar structure as defined in claim 1, said structure being confined in the space defined by a transparent sheet material sealed along its periphery to another sheet material.

5. An ID product comprising a single sheet of flexible opaque material folded at substantially the center to provide two substantially equal parts, a transparent sheet material sealed along at least three edges to a surface of one of said parts to define a pouch for confining a substantially planar object, and a laminar structure as defined in claim 1 confined within said pouch.

6. A laminar structure comprising an image-receiving element including a dyeable stratum containing a color diffusion transfer image and a protective overlay laminated to said stratum, said overlay comprising, in order, a first transparent layer of polyvinyl alcohol; a layer of a transparent, molecularly oriented, non-cross-linked, polyvinyl alcohol, a portion of which has been dyed with a dichroic dye; a second transparent layer of polyvinyl alcohol; and a transparent sheet material comprising cellulose triacetate, the laminated surface of which has been hydrolyzed, said stratum containing said color image being bonded to said first polyvinyl alcohol layer, said layer of molecularly oriented polyvinyl alcohol being water-permeable whereby water permeating through said vinyl polymer layer toward said sheet material will cause said vinyl polymer layer to separate from said sheet material.

7. A laminar structure as defined in claim 6 wherein said dyeable stratum comprises a mixture of polyvinyl alcohol and polyvinyl pyridine.

8. A laminar structure as defined in claim 6 wherein said dichroic dye is applied in the form of at least one stripe.

9. The process which comprises exposing a photosensitive element comprising at least one light-sensitive silver halide layer and associated dye developer to form a developable image; developing said image by applying an aqueous alkaline processing fluid and as a function of development forming an imagewise distribution of diffusible dye developer; transferring said imagewise distribution, at least in part, by imbibition, to a superposed dyeable stratum comprising a mixture of polyvinyl alcohol and polyvinyl pyridine to impart thereto a positive color transfer image; and laminating said image in the presence of moisture to a protective overlay comprising a transparent sheet material carrying on one side thereof, in order, a first transparent layer of polyvinyl alcohol; a layer containing a transparent, molecularly oriented, linear, high molecular weight, hydroxyl-containing vinyl polymer, at least a portion of which has been dyed with a dichroic dye; and a second transparent layer of polyvinyl alcohol, said vinyl polymer-containing layer being water-permeable, the bond formed at the interface of said vinyl polymer layer and said first polyvinyl alcohol layer being capable of being readily broken by water permeating through said laminar structure to said interface of said first polyvinyl alcohol layer and said vinyl polymer layer.

10. A process as defined in claim 9 wherein said moisture is supplied by said processing fluid, said lamination being effected while said print is still moist from processing.

* * * * *

UNITED STATES PATENT OFFICE
CERTIFICATE OF CORRECTION

Patent No. 3,655,494    Dated April 11, 1972

Inventor(s) Harold O. Buzzell

It is certified that error appears in the above-identified patent and that said Letters Patent are hereby corrected as shown below:

Column 9, line 69, "3,391,470" should read -- 3,391,479 --. Column 10, line 4, "3,058,303" should read -- 3,058,393 --. Column 11, line 17, "sad" should read -- said --.

Signed and sealed this 7th day of November 1972.

(SEAL)
Attest:

EDWARD M. FLETCHER, JR.
Attesting Officer

ROBERT GOTTSCHALK
Commissioner of Patents